United States Patent
Tang

(10) Patent No.: US 12,554,238 B2
(45) Date of Patent: Feb. 17, 2026

(54) DEVICE AND METHOD FOR ALTERNATELY CONTROLLING THE OPERATION STATE OF TWO TREATMENT EQUIPMENT

(71) Applicant: DIRECTLYTEK TECHNOLOGY CO., LTD., Hsinchu (TW)

(72) Inventor: Shih-Hao Tang, Hsinchu (TW)

( * ) Notice: Subject to any disclaimer, the term of this patent is extended or adjusted under 35 U.S.C. 154(b) by 355 days.

(21) Appl. No.: 18/463,831

(22) Filed: Sep. 8, 2023

(65) Prior Publication Data
US 2025/0085684 A1    Mar. 13, 2025

(51) Int. Cl.
G05B 19/042    (2006.01)

(52) U.S. Cl.
CPC ..... G05B 19/0423 (2013.01); G05B 19/0428 (2013.01); *G05B 2219/23377* (2013.01)

(58) Field of Classification Search
CPC ............ G05B 19/0423; G05B 19/0428; G05B 2219/23377
See application file for complete search history.

(56) References Cited

U.S. PATENT DOCUMENTS

| | | | |
|---|---|---|---|
| 2008/0047586 A1* | 2/2008 | Loldj | B01D 53/30 134/18 |
| 2008/0051944 A1* | 2/2008 | Loldj | G05B 23/0216 700/282 |
| 2008/0289167 A1* | 11/2008 | Chandler | G05B 19/4184 29/711 |
| 2020/0049297 A1* | 2/2020 | Lee | H01L 21/67248 |
| 2020/0131641 A1* | 4/2020 | Hsu | H01L 21/6719 |
| 2021/0302935 A1* | 9/2021 | Kenichiro | H01L 21/02337 |
| 2022/0223442 A1* | 7/2022 | Kuroda | H01L 21/67017 |
| 2024/0093372 A1* | 3/2024 | Takasaki | C23C 16/4412 |

* cited by examiner

*Primary Examiner* — Christopher E. Everett
(74) *Attorney, Agent, or Firm* — EGBERT, MCDANIEL & SWARTZ, PLLC

(57) ABSTRACT

Disclosed is a device and method for alternately controlling the operation state of two treatment equipment, each of which alternately operates to treat process emissions from a semiconductor manufacturing process, with two pipelines conveying the emissions to each of the treatment equipment, and two electric heating units providing heat to each of the pipelines, wherein the control device has a human-machine interface controller, a programmable controller, and a signal transmission port, the programmable controller sequentially controlling each of the control valves and each of the electric heating units so as to cause the electric heating units to select ramping up or ramping down the power rate, respectively, to reduce the electric energy consumption of the electric heating units in a standby state, and to reduce the overall carbon emissions.

5 Claims, 9 Drawing Sheets

DEVICE AND METHOD FOR ALTERNATELY CONTROLLING THE OPERATION STATE OF TWO TREATMENT EQUIPMENT

FIELD OF THE INVENTION

The present invention relates to treatment equipment for process emissions from a semiconductor manufacturing process, in particular to a device and a method for alternately controlling the operation state of two treatment equipment.

BACKGROUND OF THE INVENTION

Process emissions from the semiconductor manufacturing process must be treated by an appropriate treatment equipment unit to meet the standards before they can be released or reused. The treatment equipment unit may be a local scrubber (LSC). When manufacturing equipment performs the semiconductor manufacturing process described above and emissions are generated during the process, the treatment equipment unit must be shut down to remove the substances in the emissions it captures or to perform maintenance on the equipment. In order to ensure that the shutdown does not interfere with the progress of semiconductor manufacturing, two units of treatment equipment are configured to correspond to the manufacturing equipment, while one of the units must be shut down to remove the substances in the emissions it captures or to perform maintenance on the equipment, the other is operated to treat the emissions, each of the treatment equipment is alternately operated and shut down, ensuring an uninterrupted semiconductor manufacturing process that remains unaffected by the individual equipment shutdowns.

Two pipelines are connected to the manufacturing equipment, and each of the pipelines is connected to each of the treatment equipment, whereby the process emissions generated by the manufacturing equipment can be transferred through a selected one of the pipelines to one of the treatment equipment connected to that pipeline.

Based on the need to convey process emissions with particular substances or natures, each of the pipelines used to convey such emissions must be maintained at an appropriate temperature range to prevent the composition of the emissions from depositing inside the pipelines and clogging the pipelines as the emissions flow through the pipelines. Accordingly, two electric heating units are used to provide heat to each of the pipelines, each of the electric heating units including a plurality of electric heating belts and a temperature control device, wherein each of the electric heating belts is arranged in sequence along the pipeline configured therein, and the temperature control device is coupled to each of the electric heating belts, and wherein the temperature control device detects the temperature of each of the electric heating belts and controls the current therethrough accordingly based on the detected results, thereby controlling the heat generated by each of the electric heating belts to maintain the temperature of each of the pipelines.

One of the two treatment equipment that alternately operates and shuts down with each other is defined as a first treatment equipment unit, and the other treatment equipment unit is defined as a second treatment equipment unit. The pipeline connecting the first treatment equipment unit to the manufacturing equipment is defined as a first pipeline, and the heating unit configured with respect to the first pipeline is defined as a first electric heating unit, and the pipeline connecting the second treatment equipment unit to the manufacturing equipment is defined as a second pipeline, and the heating unit configured with respect to the second pipeline is defined as a second electric heating unit.

The first treatment equipment unit in a shutdown state is converted to an operating state to replace the second treatment equipment unit in an operating state for treating the process emissions generated by the semiconductor manufacturing equipment, thereby enabling the second treatment equipment unit to be shut down for removing the substances captured therein or for performing maintenance on the equipment. At this time, the emissions are selected to flow to the first treatment equipment unit through the first pipeline instead of flowing through the second pipeline, but the second electric heating unit still maintains the state of supplying electricity to its electric heating belt so that the second pipeline is maintained in the range of temperatures required for conveying the emissions, which constitutes unnecessary consumption of electric power and is, however, detrimental to the overall carbon emissions.

BRIEF SUMMARY OF THE INVENTION

The main purpose of the present invention is to provide a device and a method for alternately controlling the operation state of two treatment equipment.

Given the foregoing purposes, the present invention employs the following technical solutions discussed below.

A device for alternately controlling the operation state of two treatment equipment, wherein two treatment equipment are alternately operated to treat process emissions from semiconductor manufacturing, each of the treatment equipment being defined as a first treatment equipment unit and a second treatment equipment unit. A first pipeline is connected to both of the first treatment equipment unit and the manufacturing equipment generating the emissions, and a second pipeline is connected to both of the second treatment equipment unit and the manufacturing equipment. The emissions are selectively conveyed through the first pipeline or the second pipeline to either the first treatment equipment unit or the second treatment equipment unit. A first electric heating unit comprises a plurality of first electric heating belts and a first temperature controller, each of the first electric heating belts being sequentially configured along the first pipeline and respectively cladding on the first pipeline. The first temperature controller detects the temperature of the first pipeline and controlling each of the first electric heating belts to generate heat energy based on the detection. A second electric heating unit comprises a plurality of second electric heating belts and a second temperature controller, each of the second electric heating belts being sequentially configured along the second pipeline and respectively cladding on the second pipeline. The second temperature controller detecting the temperature of the second pipeline and controlling each of the second electric heating belts to generate heat energy based on the detection. A first control valve is disposed at a directional end of the first pipeline connected to the manufacturing equipment, and a second control valve is disposed at a directional end of the second pipeline connected to the manufacturing equipment.

The control device comprises a human-machine interface controller, a programmable controller, and a signal transmission port, wherein the human-machine interface controller is electrically connected to the programmable controller. The programmable controller is electrically connected to the signal transmission port, and the signal transmission port is coupled to the first control valve and the second control valve, wherein the first temperature controller and the second temperature controller 164 are coupled in parallel to the signal transmission port 50.

The human-machine interface controller comprises a display, a switching circuit, and a microprocessor, wherein the display and the switching circuit are each electrically connected to the microprocessor, and wherein the display displays the temperatures of the first pipeline and the second pipeline based on the signals from the microprocessor, and displays the on/off status of the first control valve and the second control valve. The switching circuit transmits a first control signal to the microprocessor based on the user operation. The microprocessor processes the first control signal and transmits a second control signal to the programmable controller based on the processing results, and the programmable controller processes the second control signal and, based on the processing results, sequentially controls the first control valve, the second control valve, the first temperature controller, and the second temperature controller through the signal transmission port, respectively, so that the first electric heating unit and the second electric heating unit are selected to ramp up or down the power rate, and the first control valve and the second control valve are selected to open or close the connection state of the first pipeline and the second pipeline to the manufacturing equipment, respectively.

A method for alternately controlling the operation state of two treatment equipment, which is performed by using the device for alternately controlling the operation state of two treatment equipment as described hereinbefore;

The method comprises the following steps performed in sequence.

Ramping up the power rate of the first electric heating unit: the first temperature controller controls the ramping up of each of the first electric heating belts to increase the supply of heat to the first pipeline to raise the temperature of the first pipeline.

Determining the temperature of the first pipeline: comparing whether the temperature of the first pipeline is equal to a predetermined first temperature, which is the temperature at which the process emission does not form a deposition phenomenon and does not clog the first pipeline; if the temperature of the first pipeline is lower than the first temperature, the ramp-up step of the first electric heating unit is carried out again, and if the temperature of the first pipeline is equal to the first temperature, then the subsequent steps are carried out successively.

Opening the first control valve: based on the temperature of the first pipeline being equal to the first temperature in the step of determining the temperature of the first pipeline to open the first control valve, allowing the process emissions to flow through the first pipeline to the first treatment equipment unit, and the first electric heating unit and the first treatment equipment unit entering the operating state.

Closing the second control valve: based on the temperature of the first pipeline being equal to the first temperature in the step of determining the temperature of the first pipeline to close the second control valve, preventing the process emissions from entering the second pipeline.

ramping down the power rate of the second electric heating unit: after closing that second control valve, the second temperature controller controls the ramp-down of each of those second electric heating belts to reduce the heat to be supplied to the second pipeline, so as to cool down the temperature of that second pipeline.

Determining the temperature of the second pipeline: comparing whether the temperature of the second pipeline is equal to a predetermined second temperature which is lower than the first temperature; if the temperature of the second pipeline is higher than the second temperature, then the ramp-down step of the second electric heating unit is carried out again, and if the temperature of the second pipeline is equal to the second temperature, then the second electric heating unit and the second treatment equipment unit enter a standby state.

The present invention controls ramping down the power rate of the first electric heating unit or the second electric heating unit, which is converted to a standby state, reducing the electric energy consumption of the first or second electric heating belt, thereby reducing the overall carbon emission.

DETAILED DESCRIPTION OF THE INVENTION

Figure 1:
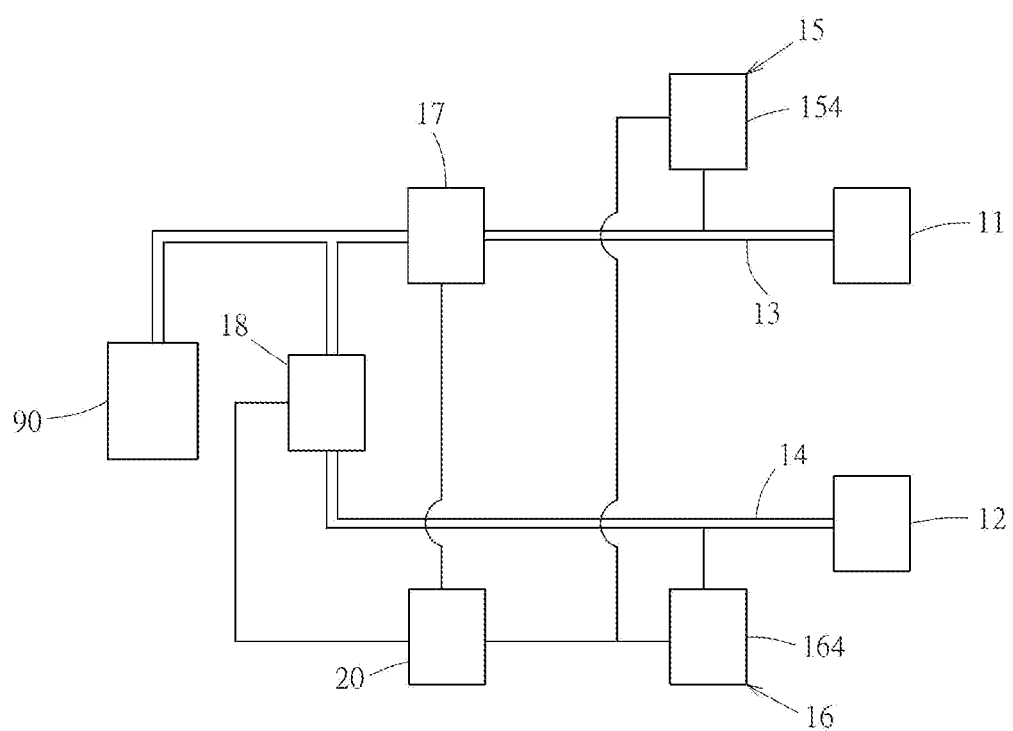
FIG. 1 is a system configuration diagram for configuring Embodiment 1 of the present invention.
Figure 2:
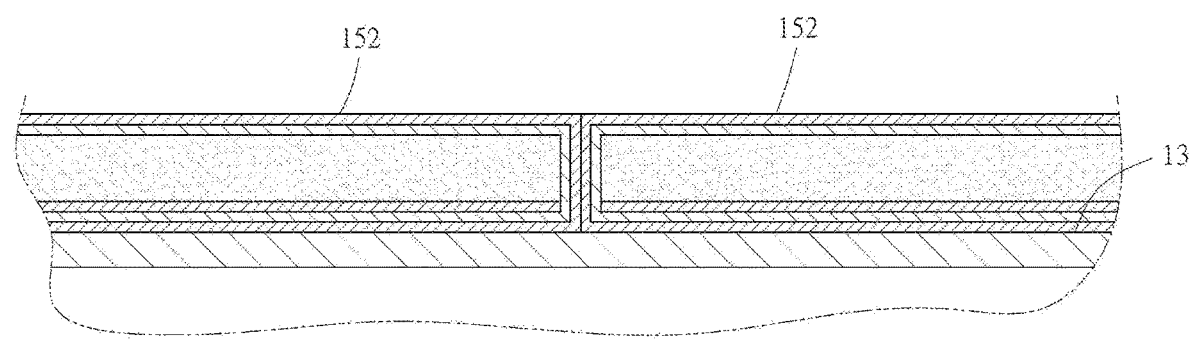
FIG. 2 is a schematic diagram of a partial cross-section of the first electric heating belt disposed in the first pipeline.
Figure 3:
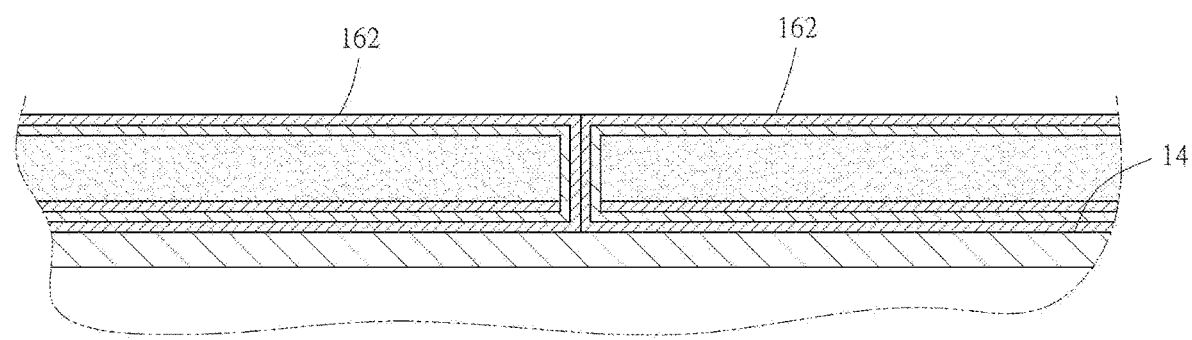
FIG. 3 is a schematic diagram of the second electric heating belt disposed in the second pipeline.
Figure 4:
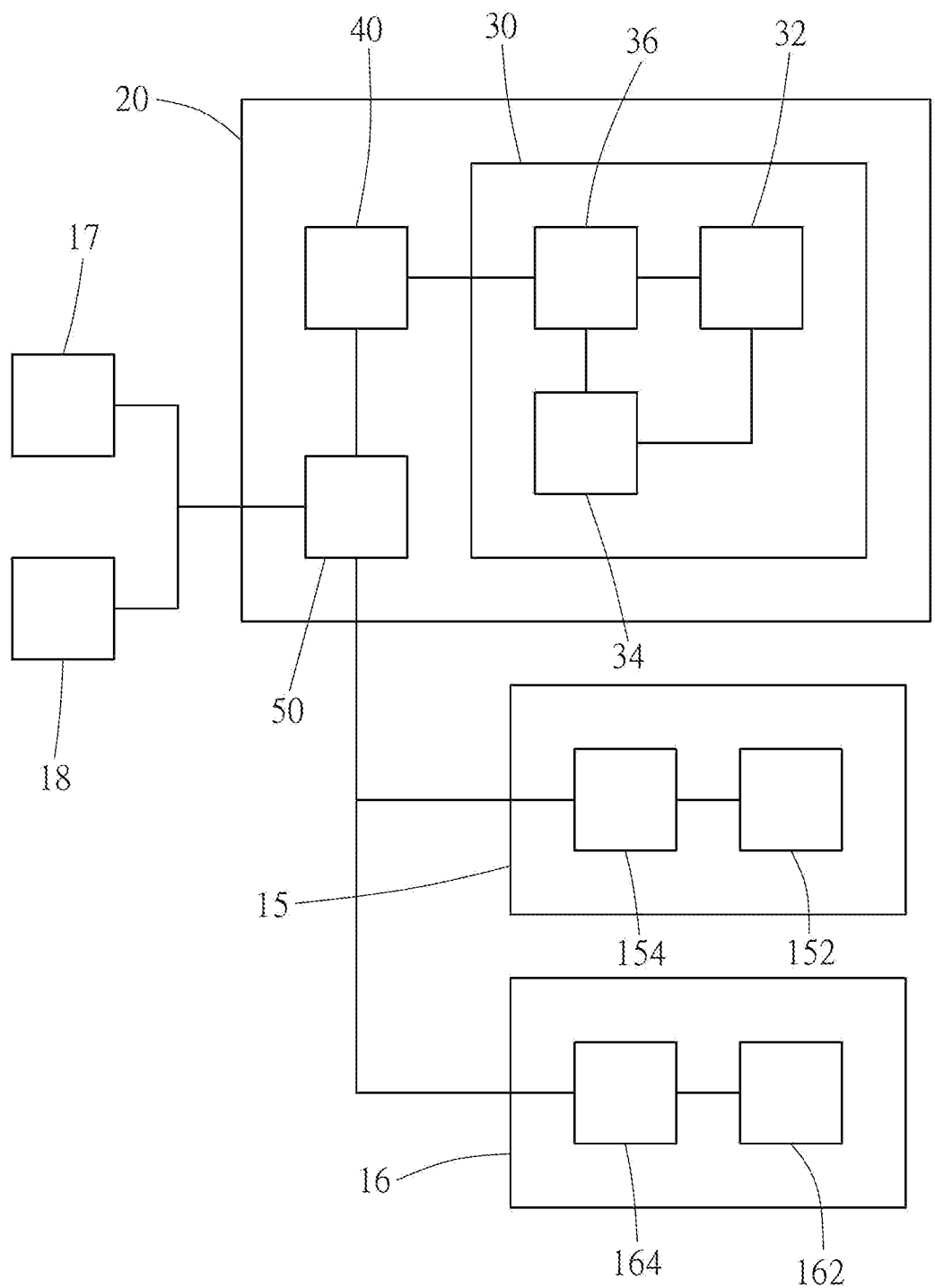
FIG. 4 is a schematic diagram of the circuit structure of the control device in Embodiment 1 of the present invention.
Figure 5:
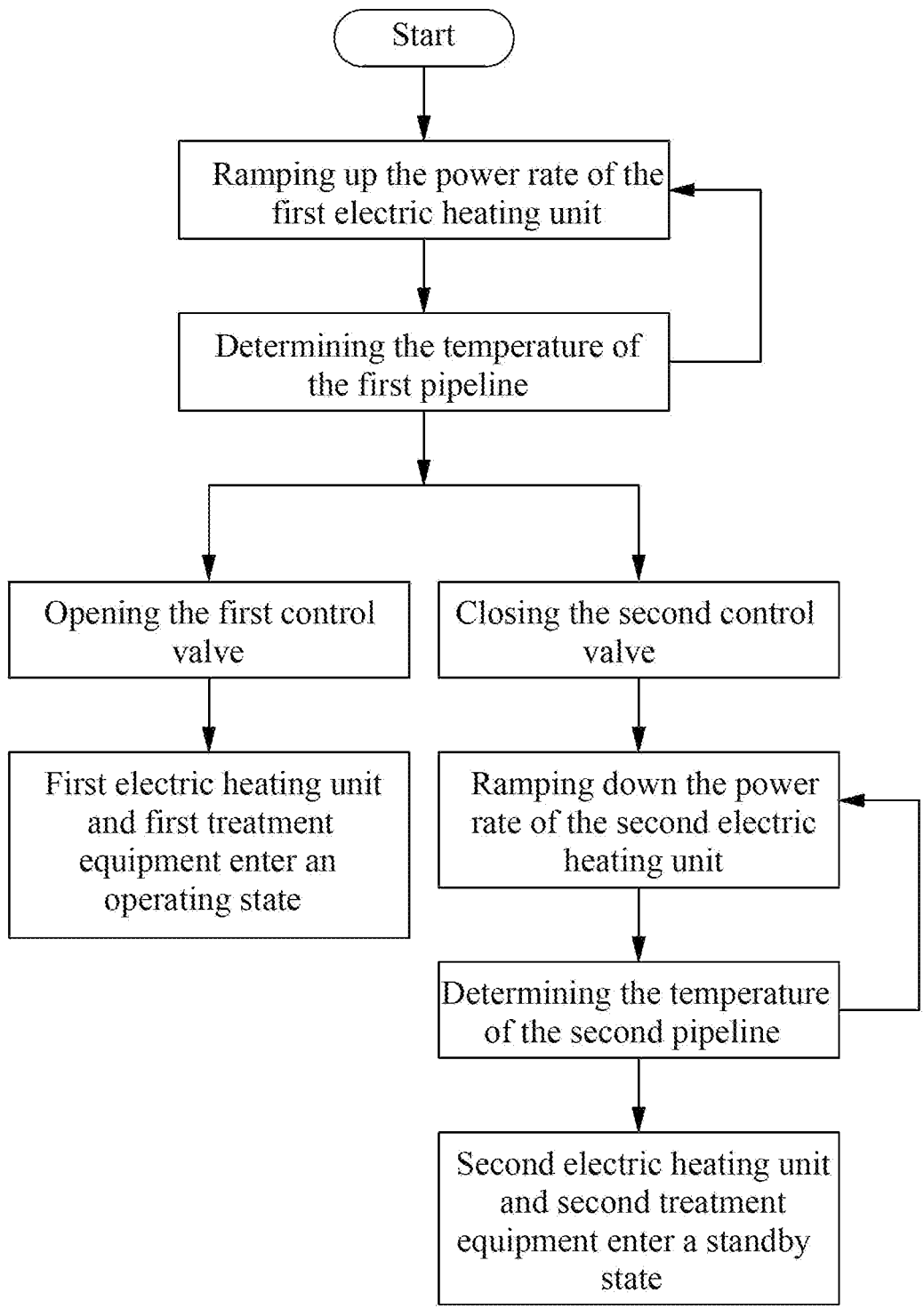
FIG. 5 is a flow chart of the method in Embodiment 1 of the present invention.

As shown in FIGS. 1 to 4, two treatment equipment are alternately operated to treat process emissions from semiconductor manufacturing, each of the treatment equipment being defined as a first treatment equipment unit 11 and a second treatment equipment unit 12. A first pipeline 13 is connected to both of the first treatment equipment unit 11 and the manufacturing equipment 90 generating the emissions, and a second pipeline 14 is connected to both of the second treatment equipment unit 12, and the manufacturing equipment 90. The emissions are selectively conveyed through the first pipeline 13 or the second pipeline 14 to either the first treatment equipment unit 11 or the second treatment equipment unit 12. A first electric heating unit 15 comprises a plurality of first electric heating belts 152 and a first temperature controller 154, each of the first electric heating belts 152 being sequentially configured along the first pipeline 13 and respectively cladding on the first pipeline 13, the first temperature controller 154 detecting the temperature of the first pipeline 13 and controlling each of the first electric heating belts 152 to generate heat energy based on the detection; and a second electric heating unit 16 comprises a plurality of second electric heating belts 162 and a second temperature controller 164, each of the second electric heating belts 162 being sequentially configured along the second pipeline 14 and respectively cladding on the second pipeline 14, the second temperature controller 164 detecting the temperature of the second pipeline 14 and controlling each of the second electric heating belts 162 to generate heat energy based on the detection. A first control valve 17 is disposed at a directional end of the first pipeline 13 connected to the manufacturing equipment 90, and a second control valve 18 is disposed at a directional end of the second pipeline 14 connected to the manufacturing equipment 90.

The first electric heating unit 15 and the second electric heating unit 16 are prior art familiar to those skilled in the art to which the present invention belongs, respectively, hence the specific composition of the first electric heating unit 15 and the second electric heating unit 16 will not be described in detail.

A control device 20 for controlling the first treatment equipment unit 11 and the second treatment equipment unit 12 to convert alternating operating state, comprising a human-machine interface controller 30, a programmable controller 40, and a signal transmission port 50, wherein the human-machine interface controller 30 is electrically connected to the programmable controller 40, the programmable controller 40 is electrically connected to the signal transmission port 50, and the signal transmission port 50 is coupled to the first control valve 17 and the second control valve 18, and wherein the first temperature controller 154 and the second temperature controller 164 are coupled in parallel to the signal transmission port 50.

The human-machine interface controller 30 comprises a display 32, a switching circuit 34, and a microprocessor 36, wherein the display 32 and the switching circuit 34 are each electrically connected to the microprocessor 36, and wherein the display 32 displays the temperatures of the first pipeline 13 and the second pipeline 14 based on the signals from the microprocessor 36, and displays the on/off status of the first control valve 17 and the second control valve 18. The switching circuit 34 transmits a first control signal to the microprocessor 36 based on the user operation. The microprocessor 36 processes the first control signal and transmits a second control signal to the programmable controller 40 based on the processing results and the programmable controller 40 processes the second control signal and, based on the processing results, sequentially controls the first control valve 17, the second control valve 18, the first temperature controller 154, and the second temperature controller 164 through the signal transmission port 50, respectively, so that the first electric heating unit 15 and the second electric heating unit 16 can be selected to ramp up or down the power rate, and the first control valve 17 and the second control valve 18 can be selected to open or close the connection state of the first pipeline 13 and the second pipeline 14 to the manufacturing equipment 90, respectively.

The programmable controller 40 transmits signals to the first control valve 17, the second control valve 18, the first temperature controller 154, and the second temperature controller 164, respectively, through the signal transmission port 50 to operate the first control valve 17, the second control valve 18, the first temperature controller 154, and the second temperature controller 164, respectively. The first temperature controller 154 and the second temperature controller 164 transmit signals to the programmable controller 40 and the human-machine interface controller 30, respectively, through the signal transmission port 50 so that the human-machine interface controller 30 can display the temperature of the first pipeline 13 and the second pipeline 14, thereby providing a user with the convenience of monitoring the first pipeline 13 and the second pipeline 14.

The first treatment equipment unit 11 can be converted to an operating state as needed to replace the second treatment equipment unit 12 in treating the process emissions, and convert the second treatment equipment unit 12 from the operating state to a shutdown state for removing substances captured in the process of treating the process emissions by the second treatment equipment unit 12 or for performing equipment maintenance, and after completion of the aforesaid removal of captured substances or equipment maintenance, the second treatment equipment unit 12 can be converted to a standby state. When the first treatment equipment unit 11 needs to remove the substance or perform equipment maintenance, the second treatment equipment unit 12 converts to an operating state, while the first treatment equipment unit 11 enters a shutdown state, and the first treatment equipment unit 11 and the second treatment equipment unit 12 alternately convert to their operation state, thereby allowing the manufacturing equipment 90 to continue the operation to perform a semiconductor manufacturing.

By operating the human-machine interface controller 30, the user can sequentially control the first control valve 17, the second control valve 18, the first temperature controller 154, and the second temperature controller 164 through the programmable controller 40 to enable the first electric heating unit 15 and the second electric heating unit 16 to ramp up or ramp down the power rate, respectively, and the first control valve 17 and the second control valve 18 to open or close the first pipeline 13 and the second pipeline 14, respectively, to communicate with the manufacturing equipment 90 to meet the needs of the first treatment equipment unit 11 and the second treatment equipment unit 12 for alternately converting the operation state.

In coordination with the first treatment equipment unit 11 or the second treatment equipment unit 12 being converted to the shutdown state, the programmable controller 40 controls the corresponding first electric heating unit 15 or second electric heating unit 16 to ramp down the power rate, reducing the electrical energy consumption of each of those first heating belts 152 or each of those second heating belts 162, thereby enabling the control device 20 to reduce the overall carbon emissions.

As shown in FIGS. 5 to 9, the method of converting the first treatment equipment unit 11 and the second treatment equipment unit 12 to an alternate operation state performed by the control device 20 includes the following steps performed in sequence:

Ramping up the power rate of the first electric heating unit: the programmable controller 40 transmits a signal to the first electric heating unit 15, and the first temperature controller 154 controls the ramping up of each of the first electric heating belts 152 based on the said signal to increase the supply of heat to the first pipeline 13 to raise the temperature of the first pipeline 13; wherein controlling the ramping up of each of the first electric heating belts 152 refers to increasing the supply of electricity to each of the first electric heating belts 152 to raise the temperature of each of the first electric heating belts 152.

Determining the temperature of the first pipeline: comparing whether the temperature of the first pipeline 13 is equal to a predetermined first temperature T1, which is the temperature at which the process emission does not form a deposition phenomenon and does not clog the first pipeline 13, and the specific temperature value of the first temperature T1 is determined according to the nature of the process emission flowing through the first pipeline 13 and the composition thereof; if the temperature of the first pipeline 13 is lower than the first temperature T1, the ramp-up step of the first electric heating unit 15 is carried out again, and if the temperature of the first pipeline 13 is equal to the first temperature T1, then the subsequent steps are carried out successively.

Opening the first control valve: based on that the temperature of the first pipeline 13 is equal to the first temperature T1 in the step of determining the temperature of the first pipeline, the programmable controller 40 transmits the signal to the first control valve 17 to control the opening of the first control valve 17 to allow the process emissions to flow through the first pipeline 13 to the first treatment equipment unit 11, and the first electric heating unit 15 and the first treatment equipment unit 11 to enter into the operating state; after the temperature of the first pipeline 13 rises to the first temperature T1, the programmable controller 40 starts to control the opening of the first control valve 17, and when the first pipeline 13 has not yet risen to the first temperature T1, the first control valve 17 remains in a closed state, and the process emissions cannot enter the first pipeline 13, thereby preventing the process emissions from being introduced into the first pipeline 13 prematurely, which may result in the process emissions being deposited within the first pipeline 13 or clogging of the first pipeline 13.

Closing the second control valve: based on that the temperature of the first pipeline 13 is equal to the first temperature T1 in the step of determining the temperature of the first pipeline, the second control valve 18 is closed, thereby preventing the process emissions from entering the second pipeline 14.

Ramping down the power rate of the second electric heating unit: after closing that second control valve 18, the programmable controller 40 transmits the signal to the second electric heating unit 16, and the second temperature controller 164 controls the ramp-down of each of those second electric heating belts 162 based on the said signal to reduce the heat to be supplied to the second pipeline 14, so as to cool down the temperature of the second pipeline 14; wherein controlling the ramp-down of each of the second electric heating belts 162 refers to reducing the power supplied to the respective second electric heating belt 162, thereby reducing the temperature of the respective second electric heating belt 162, and reducing the electricity consumed by each of the respective second electric heating belts 162.

In the ramping down step of the second electric heating unit, two ramping down modes may be selected to reduce the power supply to each of the second heating belts 162, wherein a first ramping down mode is to reduce the current through each of the second heating belts 162, but still maintain the power supply to each of the second heating belts 162, and a second ramping down mode is to stop the power supply to each of the second heating belts 162. In both ramping down modes, the power supply to the second temperature controller 164 is still maintained so that it can continue to operate to detect the temperature of the second pipeline 14 and maintain control of the second heating belts 162, wherein the ramping down is not intended to stop the operation of the second electric heating unit 16.

Determining the temperature of the second pipeline: comparing whether the temperature of the second pipeline 14 is equal to a predetermined second temperature T2 which is lower than the first temperature T1; if the temperature of the second pipeline 14 is higher than the second temperature T2, then the ramp-down step of the second electric heating unit is carried out again, and if the temperature of the second pipeline 14 is equal to the second temperature T2, then the second electric heating unit 16 and the second treatment equipment unit 12 enter a standby state.

In the line charts shown in FIGS. 6 to 9, the horizontal axis represents the time and the vertical axis represents the temperature.

Figure 6:
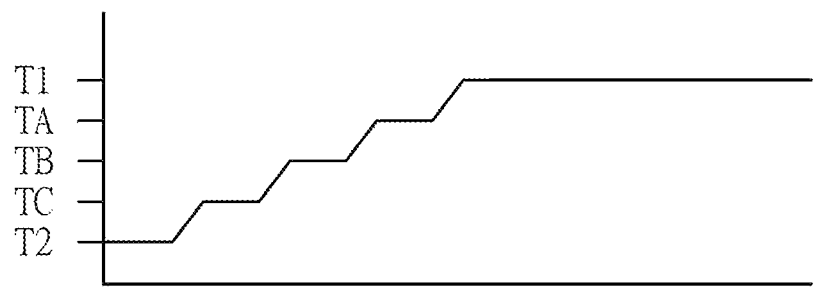
FIG. 6 is a line chart (1) for controlling the temperature change of the first pipeline in Embodiment 1 of the present invention.

FIG. 6 exemplifies that the first pipeline 13 is selected to be heated from the second temperature T2 to the first temperature T1 in a stepwise manner, wherein Ta, Tb, and Tc represent temperatures at different stages of heating, and the temperature of the first pipeline 13 is successively reduced from the first temperature T1 to the temperature Ta, the temperature Tb, and the temperature Tc, and then reduced to the second temperature T2.

Figure 7:
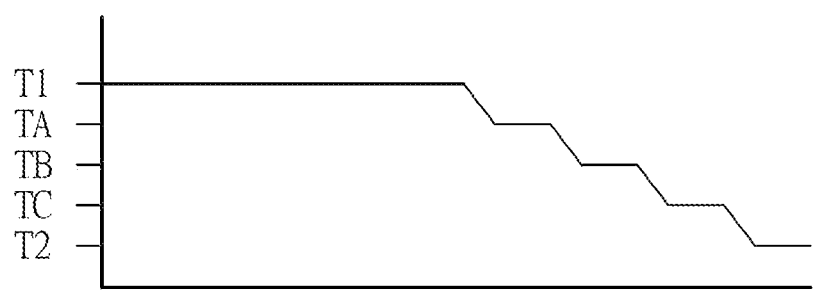
FIG. 7 is a line chart (1) for controlling the temperature change of the second pipeline in Embodiment 1 of the present invention.

FIG. 7 exemplifies that the second pipeline 14 is selected to be cooled down from the first temperature T1 to the second temperature T2 in a stepwise manner, wherein Ta, Tb, and Tc represent the temperatures at different stages of heating, and the temperature of the second pipeline 14 is successively reduced from the first temperature T1 to the temperatures Tc, the temperature Tb, and the temperature Ta, and then reduced to the second temperature T2.

Figure 8:
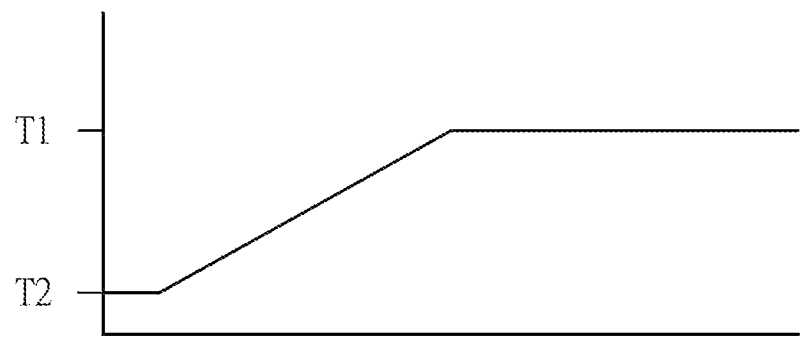
FIG. 8 is a line chart (2) for controlling the temperature change of the first pipeline in Embodiment 1 of the present invention.
Figure 9:
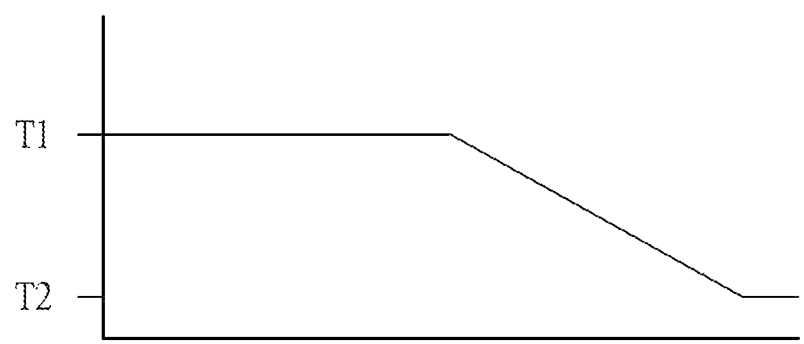
FIG. 9 is a line chart (2) for controlling the temperature change of the second pipeline in Embodiment 1 of the present invention.

FIG. 8 exemplifies that the first pipeline 13 is selected for continuous heating from the second temperature T2 to the first temperature T1, and FIG. 9 illustrates that the second pipeline 14 is selected for continuous cooling from the first temperature T1 to the second temperature T2.

The mentioned standby state is distinct from a shutdown or suspended state. The shutdown or suspended state is merely a variation of the above standby state.

After the second electric heating unit 16 has ramped down the power rate to a standby state, the second electric heating unit 16 may be selected to continuously supply power to each of the second heating belts 162 so that each of them maintains a small amount of heat supply to the second pipeline 14, and the temperature of the second pipeline 14 can be maintained at the second temperature T2 which is higher than the room temperature. In the event of an unexpected accident occurs in which the process emissions are unable to pass through the first pipeline 13 or the first treatment equipment unit 11 is unable to treat the emissions, the second electric heating unit 16 in the standby state is able to drive the second pipeline 14 from the second temperature T2, which is above the room temperature, to the first temperature T1 in a shorter time so that the process emissions can selectively flow to the second treatment equipment unit 12 through the second pipeline 14, the second treatment equipment unit 12 replacing the first treatment equipment unit 11 in treating the process emissions, thereby reducing the adverse effects that may be caused by the accident.

The display 32 may be selected as a touch display, which displays icons that provide a touch operation of the first electric heating unit 15 and the second electric heating unit 16 to ramp up or ramp down the power rate, and the switching circuit 34 is electrically connected to the display 32 so that the user can operate the switching circuit 34 by simply touching the icons.

The control device 20 performs the aforementioned method of converting the first treatment equipment unit 11 and the second treatment equipment unit 12 into alternate operation state, and the programmable controller 40 sequentially controls the first electric heating unit 15 to ramp up the power rate, the first control valve 17 to open, the second control valve 18 to close, and the second electric heating unit 16 to ramp down the power rate, thereby forming an effective anti-deactivation mechanism and preventing the user from incorrectly operating the first electric heating unit 15, the first control valve 17, the second control valve 18, or the second electric heating unit 16 to fail to perform the correct action at the correct time.

Figure 10:
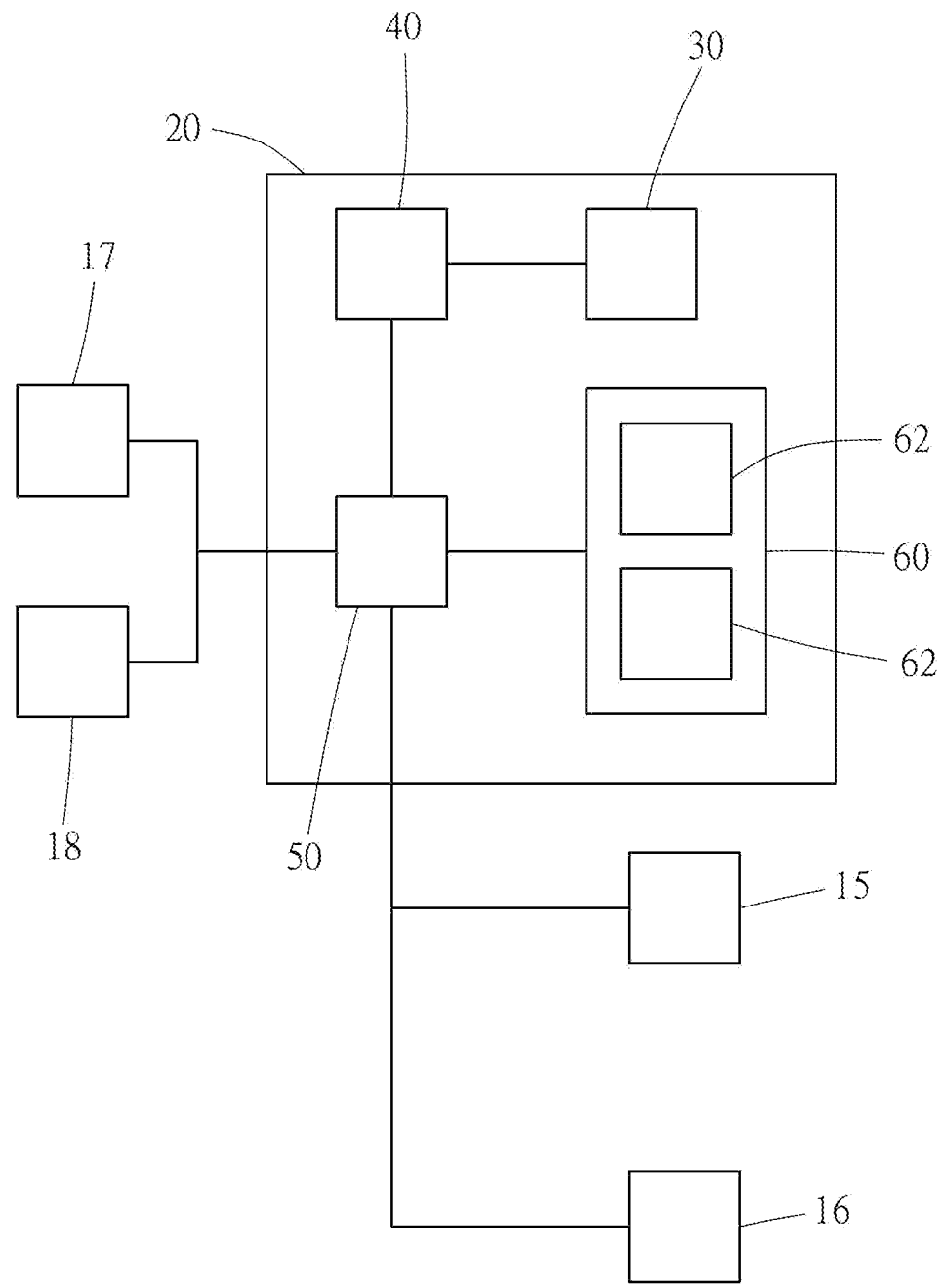
FIG. 10 is a schematic diagram of the circuit structure of the control device in Embodiment 2 of the present invention.

As shown in FIG. 10, Embodiment 2 differs from Embodiment 1 in that the control device 20 further comprises a power control module 60 electrically connected to the signal transmission port 50 and the power control module 60 is connected in parallel with the programmable controller 40. The power control module 60 comprises two manual switches 62, each of which controls the power supply to each of the first electric heating belts 152 and each of the second electric heating belts 162 through the signal transmission port 50, each of which is linked to each other so as to form an anti-deactivation mechanism for preventing the user from incorrectly operating to cause each of the first electric heating belts 152 and each of the second electric heating belts 162 to be ramped up or ramped down simultaneously.

Embodiment 2 may optionally operate the human-machine interface controller 30 or the power control module 60 to control the operation of the first electric heating unit 15 or the second electric heating unit 16, as desired.

Figure 11:
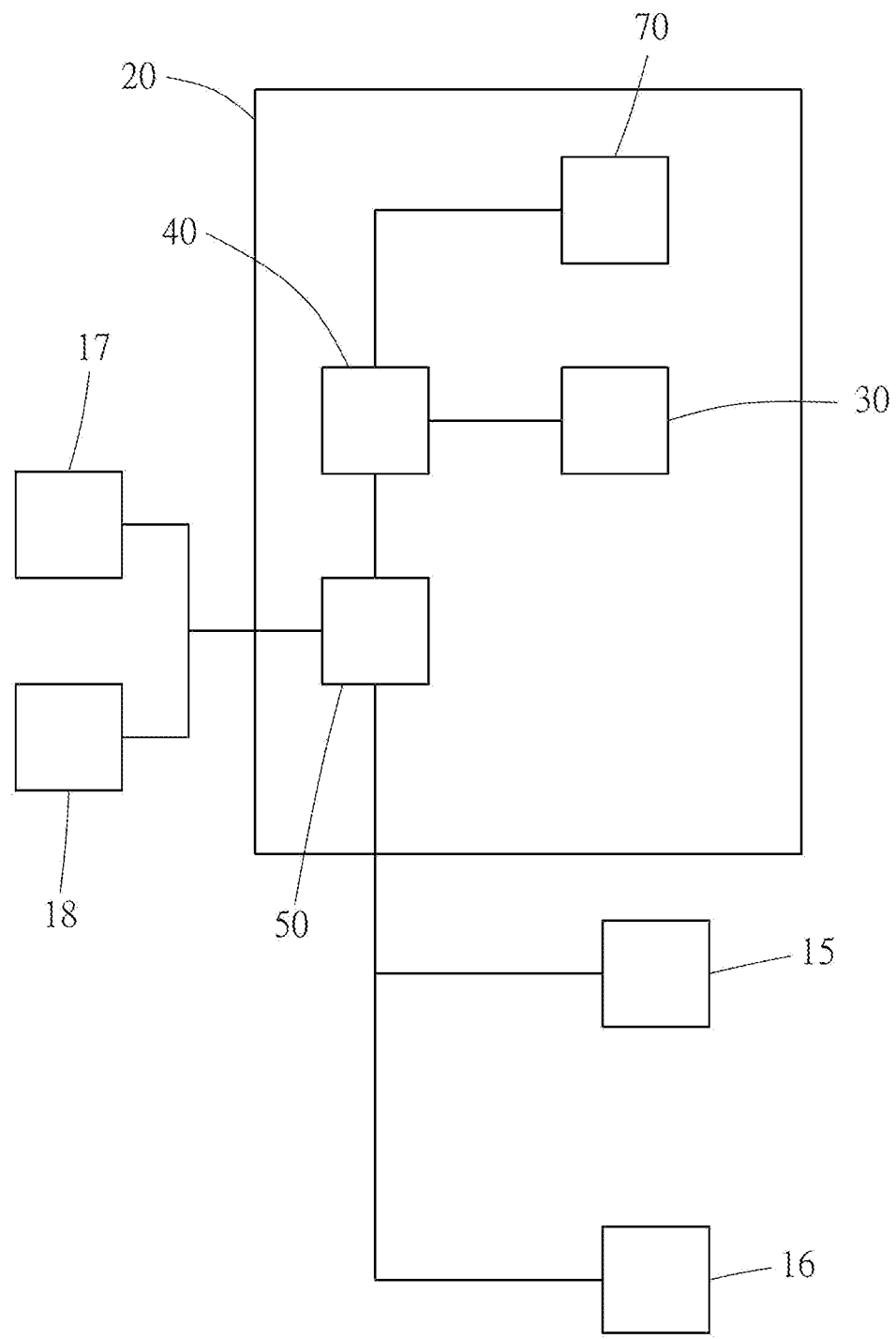
FIG. 11 is a schematic diagram of the circuit structure of the control device in Embodiment 3 of the present invention.

As shown in FIG. 11, Embodiment 3 differs from Embodiment 1 in that the control device 20 further comprises a second human-machine interface controller 70 connected to the programmable controller 40, and the human-machine interface controller 30 is connected in parallel to the second human-machine interface controller 70, a wired or wireless connection may be selected between the second human-machine interface controller 70 and the programmable controller 40, and the second human-machine interface controller 70 and the programmable controller 40 may also be selected to transmit signals to each other via a wireless network, whereby the user may optionally conduct the operation remotely via the second human-machine interface controller 70.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. A device for controlling an operation state of treatment equipment, the treatment equipment being alternatively operated to treat process emissions from manufacturing equipment in semiconductor manufacturing, the treatment equipment being a first treatment equipment unit and a second treatment equipment unit, the device comprising:
a first pipeline adapted to be connected between the first treatment equipment unit and the manufacturing equipment;
a second pipeline adapted to be connected to the second treatment equipment unit and the manufacturing equipment such that the process emissions are selectively conveyed through said first pipeline and said second pipeline to either the first treatment equipment unit and the second treatment equipment unit;
a first electric heating unit having a plurality of first electric heating belts and a first temperature controller, each of the plurality of first electric heating belts sequentially configured along said first pipeline so as to clad said first pipeline, the first temperature controller detecting a temperature of said first pipeline and controlling each of the plurality of first electric heating belts so as to generate heat energy based on the detected temperature;
a second electric heating unit having a plurality of second electric heating belts and a second temperature controller, each of the plurality of second electric heating belts being sequentially configured along said second pipeline so as to clad said second pipeline, the second temperature controller detecting a temperature of said second pipeline and controlling each of the plurality of second electric heating belts so as to generate heat energy based on the temperature detected by the second temperature controller;
a first control valve disposed at an end of said first pipeline and adapted to be connected to the manufacturing equipment;
a second control valve disposed at an end of said second pipeline and adapted to be connected to the manufacturing equipment;
a human-machine interface controller;
a programmable controller; and
a signal transmission port, wherein said human-machine interface controller is electrically connected to said programmable controller, said programmable controller being electrically connected to said signal transmission port, said second positioning portion being coupled to said first control valve and to said second control valve, wherein said first temperature controller and said second temperature controller are coupled in parallel to said signal transmission port, said human-machine interface controller comprising:
a display;
a switching circuit; and
a microprocessor, wherein said display and said switching circuit are each electrically connected to said microprocessor, said display displaying the temperature of said first pipeline and the temperature of said second pipeline based on signals from said microprocessor, said display displaying an on status and an off status of said first control valve and said second control valve, said switching circuit transmitting a first control signal to said microprocessor based on an operation by a user, said microprocessor processing the first control signal and transmitting a second control signal to said programmable controller based on processing results so as to sequentially control said first control valve and said second control valve and said first temperature controller and said second temperature controller through said signal transmission port respectively such that said first electric heating unit and said second electric heating unit are selected to ramp up or ramp down a power rate, said first control valve and said second control valve selectively opening or closing a connection state of said first pipeline and said second pipeline to the manufacturing equipment respectively.

2. The device of claim 1, further comprising:
a power control module electrically connected to said signal transmission port, said power control module being connected in parallel to said programmable controller, said power control module having a pair of manual switches each controlling a power supply of each of the plurality of first electric heating belts and each of the plurality of second electric heating belts through said signal transmission port.

3. The device of claim 1, wherein said display is a touch display that displays icons so as to allow a touch operation of said first electric heating unit and said second electric heating unit so as to ramp up or ramp down the power rate, said switching circuit being electrically connected to said display.

4. A method for alternately controlling an operation state of a first treatment equipment unit and a second treatment equipment unit so as to treat process emissions from semiconductor manufacturing, a first pipeline being connected to both the first treatment equipment unit and to a manufacturing equipment of the semiconductor manufacturing, a second pipeline being connected to both the second treatment equipment unit and the manufacturing equipment such that the process emissions are selectively conveyed through the first pipeline or the second pipeline to either the first treatment equipment unit or the second treatment equipment unit, the first electric heating unit having a plurality of first electric heating belts and a first temperature controller, each of the plurality of first electric heating belts being sequentially configured to clad the first pipeline, the first temperature controller detecting a temperature of the first pipeline and controlling each of the plurality of first electric heating belts so as to generate heat energy based on the detected temperature, a second electric heating unit having a plurality of second electric heating belts and a second temperature controller, each of the plurality of second electric heating belts being sequentially configured along said second pipeline so as to clad the second pipeline, the second temperature controller detecting a temperature of the second pipeline and controlling each of the plurality of second electric heating belts so as to generate heat based on the temperature detected, a first control valve disposed at an end of the first pipeline that is connected to the manufacturing equipment, and a second control valve disposed at an end of the second pipeline that is connected to the manufacturing equipment, the method comprising:

ramping up a power rate of the first electric heating unit, wherein the first temperature controller controls the ramping up of each of the plurality of first electric heating belts so as to increase a supply of heat to the first pipeline in order to raise the temperature of the first pipeline;

determining the temperature of the first pipeline;

comparing whether the determined temperature of the first pipeline is equal to a predetermined first temperature, the predetermined first temperature being a temperature at which the process emission does not form a deposition and does not clog the first pipeline, wherein if the temperature of the first pipeline is less than the predetermined first temperature the step of ramping up of the first electric heating unit is carried out again, wherein if the temperature of the first pipeline is equal to the predetermined first temperature then subsequent steps are carried out successively;

opening the first control valve based on the temperature of the first pipeline being equal to the predetermined first temperature so as to allow the process emissions to flow through the first pipeline to the first treatment equipment unit, the first electric heating unit and the first treatment equipment unit entering the opening state;

closing the second control valve based on the temperature of the first pipeline being equal to the predetermined first temperature so as to prevent process emissions from entering the second pipeline;

ramping down a power rate of the second electric heating unit after closing the second control valve, wherein the second temperature controller controls the ramping down of each of the plurality of second electric heating belts so as to reduce heat supplied to the second pipeline so as to cool the temperature of the second pipeline; and determining the temperature of the second pipeline by comparing whether the temperature of the second pipeline is equal to a predetermined second temperature, the predetermined second temperature being lower than the predetermined first temperature, wherein if the temperature of the second pipeline is higher than the predetermined second temperature then the step of ramping down of the second electric heating unit is carried out again, wherein if the temperature of the second pipeline is equal to the predetermined second temperature then the second electric heating unit and the second treatment equipment unit enter into a standby state.

5. The method of claim 4, wherein the predetermined second temperature is between the predetermined first temperature and an ambient temperature.

* * * * *